Aug. 5, 1969  A. P. FORSTER  3,459,268
CRAWLER TRACTOR GROUND PULVERIZER ATTACHMENT
Filed Oct. 13, 1965  4 Sheets-Sheet 4
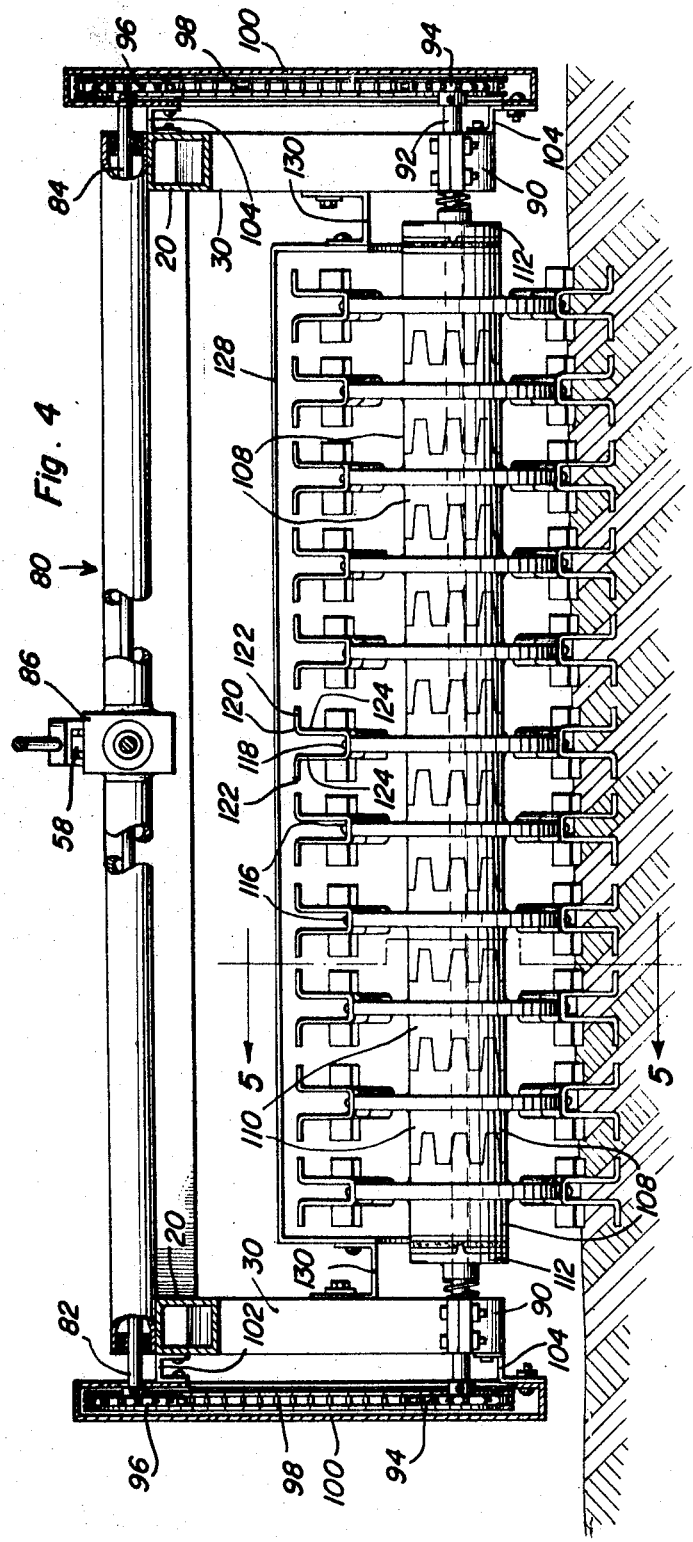
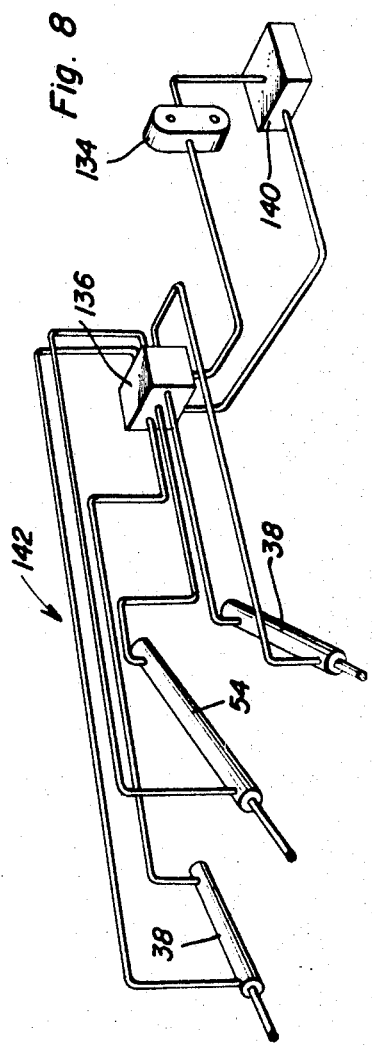
Albert P. Forster
INVENTOR.

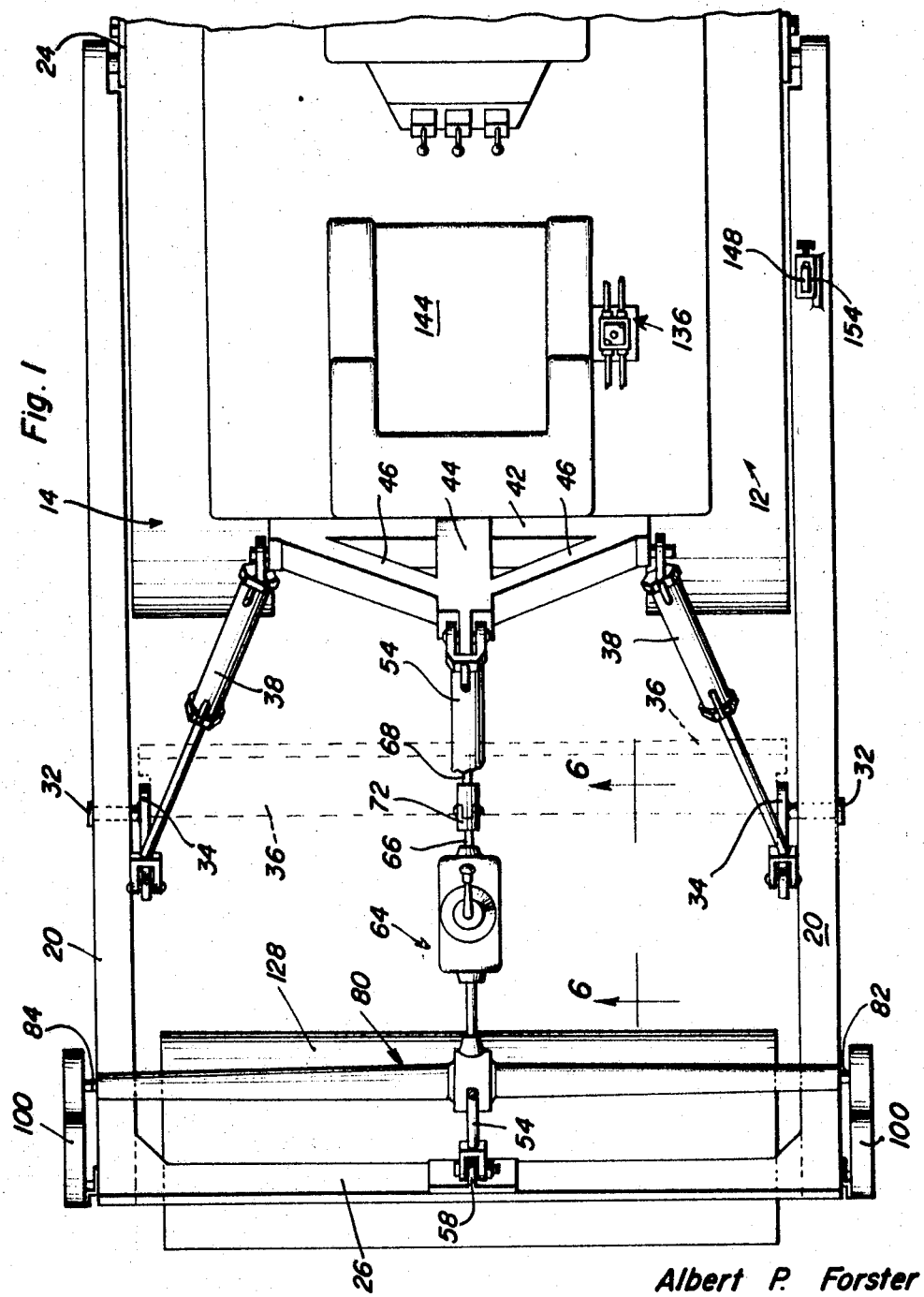

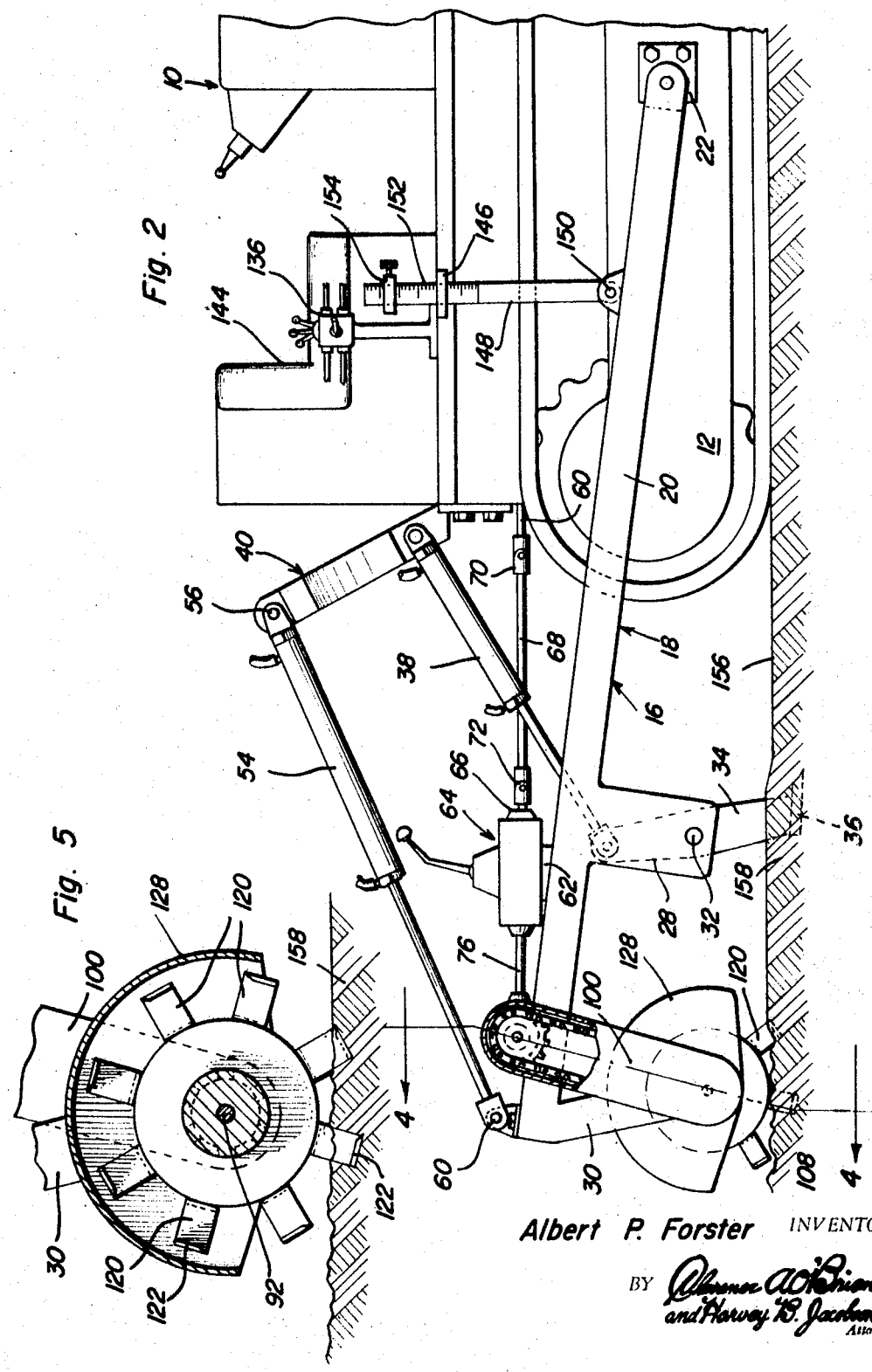

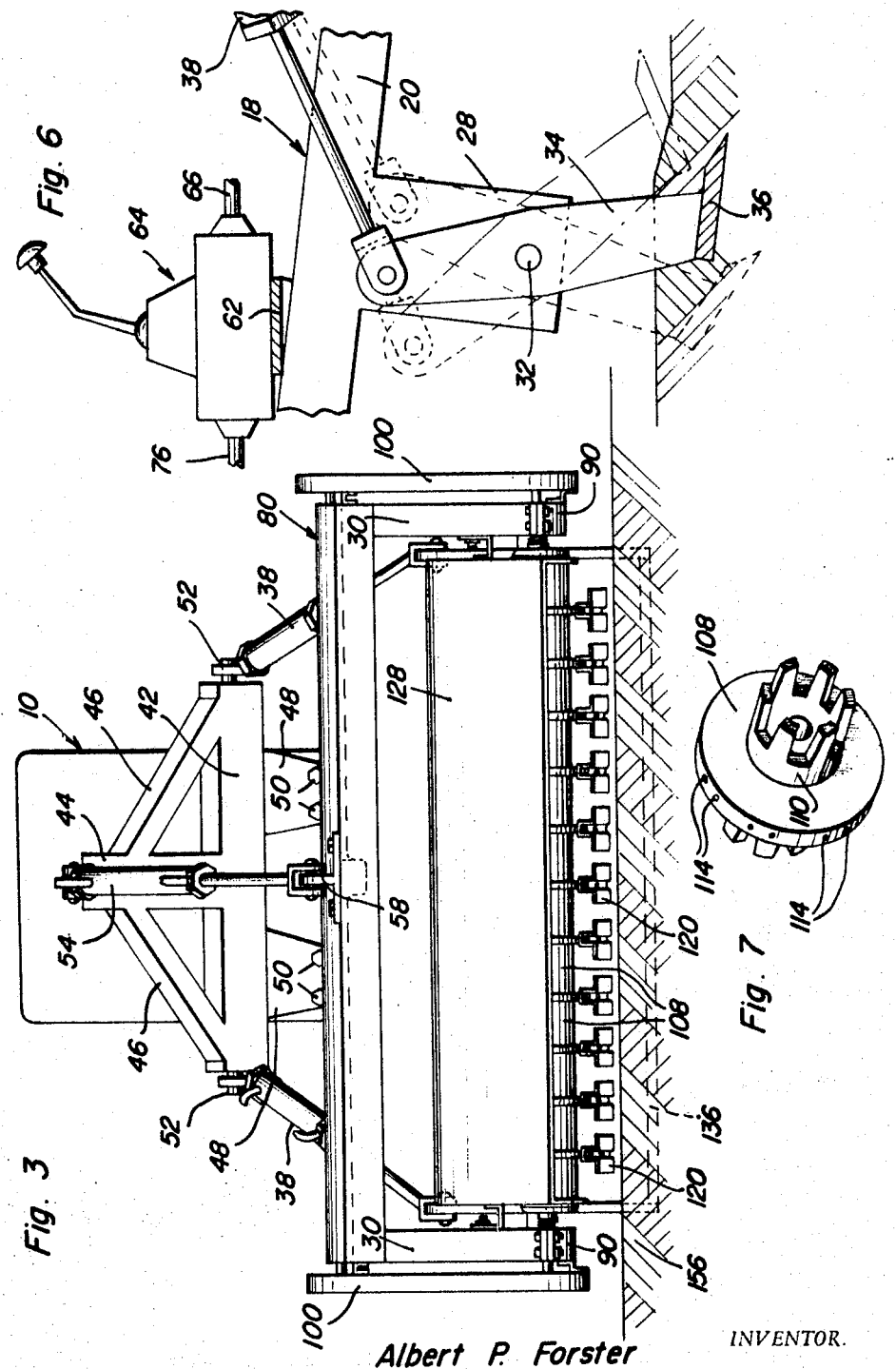

United States Patent Office 3,459,268
Patented Aug. 5, 1969

3,459,268
CRAWLER TRACTOR GROUND PULVERIZER ATTACHMENT
Albert P. Forster, Harlingen, Tex., assignor of one-half to Reginald F. Muggley, Harlingen, Tex.
Filed Oct. 13, 1965, Ser. No. 495,404
Int. Cl. A01b 49/02, 63/102
U.S. Cl. 172—63                5 Claims

ABSTRACT OF THE DISCLOSURE

A draft vehicle mounted ground pulverizing attachment including a pair of powered opposite side front to rear extending lift arms pivotally supported at their forward end from a draft vehicle and including vertically swingable rear ends between which an elongated horizontally disposed and driven rotary ground pulverizing structure is journalled, the attachment also including an elongated horizontally disposed ground stripping blade disposed forward of said pulverizing structure and supported from said arms, intermediate their front and rear ends, for up and down swinging therewith and also for up and down adjustment relative to said arms and the ground pulverizing structure.

---

This invention relates to a novel and useful ground pulverizing attachment and more specifically to a pulverizing attachment designed primarily for use in conjunction with crawler treaded tractors of the type including a rearwardly disposed power take-off assembly. While the pulverizer attachment illustrated and described herein is utilized in conjunction with a crawler treaded tractor including a power take-off assembly and is driven by the latter, it is to be understood that the rotary portion of the pulverizing attachment to be set forth more fully hereinafter may also be driven by a hydraulic motor operatively connected to a hydraulic pump of the type conventionally provided on crawler treaded tractors.

The ground pulverizing attachment of the instant invention is designed to provide a means whereby the top layer of the ground traversed by a crawler treaded tractor equipped with the pulverizer attachment of the instant invention may be pulverized. The pulverizer attachment includes means by which its pulverizing action may be precisely controlled to pulverize the ground to a given depth. The attachment includes a rotary pulverizing portion which acts upon the ground to be pulverized in the same manner as a "roto-tiller" and the rotary portion of the attachment is preceded by a horizontally disposed and vertically adjustable stripping blade similar to those blades which are utilized to cut sod.

The stripper or stripping blade may be vertically adjusted so as to pass beneath the surface of the ground over which the associated crawler treaded tractor is moving at a given depth. The following rotary portion of the pulverizing attachment is also vertically adjustable and the stripping blade is vertically adjustable relative to the rotary portion of the pulverizing attachment whereby the ground over which the tractor traverses may be pulverized to a precise depth.

The main object of this invention is to provide a ground pulverizing attachment for a crawler treaded tractor and which will be operative to pulverize the ground over which the crawler treaded tractor moves to a precise depth.

Another object of this invention, in accordance with the preceding object, is to provide a ground pulverizing attachment including means whereby the upper level of the ground to be pulverized may first be stripped from the lower portion of the ground before being acted upon by the rotary portion of the pulverizer attachment.

The rotary portion of the pulverizer attachment is driven by the power take-off of the associated crawler tractor and speed reduction means is provided whereby the rotary speed of the rotary portion of the pulverizer attachment may be varied independently of the speed of the crawler tractor and in this manner the pulverizing action of the rotary portion of the pulverizer attachment on the upper portion of the ground stripped by the stripper blade may be varied.

Yet another object of this invention is to provide a ground pulverizing attachment in accordance with the preceding objects and constructed in a manner whereby it may be readily operatively supported and driven from an associated crawler treaded tractor.

Another object of this invention is to provide a pulverizer attachment in accordance with the preceding objects and including a reliable depth gauge operative to give an accurate indication of the depth to which the ground acted upon by the pulverizer is being pulverized.

A further object of this invention, in accordance with the immediately preceding object, is to provide a depth gauge for rendering an accurate visual indication of the operating depth of the pulverizer attachment and which is positioned in a location relative to the operator's station of the associated crawler treaded tractor in a manner such that a visual reading of the depth gauge may be readily carried out by the operator of the associated crawler tractor with little effort.

A final object of this invention to be specifically enumerated herein is to provide a ground pulverizing attachment for crawler tractors which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary top plan view of the rear portion of a crawler treaded tractor shown with the pulverizer attachment of the instant invention operatively mounted thereon, portions of the pulverizer attachment being broken away and shown in phantom lines to more clearly illustrate the basic mounting components of the pulverizer attachment;

FIGURE 2 is a fragmentary side elevational view of the assemblage illustrated in FIGURE 1 and with portions of the attachment broken away and shown in vertical section;

FIGURE 3 is a rear elevational view of the assemblage illustrated in FIGURES 1 and 2;

FIGURE 4 is an enlarged fragmentary transverse vertical sectional view taken substantially upon the plane indicated by the section line 4—4 of FIGURE 2;

FIGURE 5 is a fragmentary longitudinal vertical sectional view taken substantially upon the plane indicated by the section line 5—5 of FIGURE 4;

FIGURE 6 is an enlarged fragmentary longitudinal vertical sectional view taken substantially upon the plane indicated by the section line 6—6 of FIGURE 1;

FIGURE 7 is a perspective view of one of the plurality of rotor wheels of the rotary portion of the pulverizing attachment; and FIGURE 8 is a diagrammatical view of the hydraulic system of the attachment.

Referring now more specifically to the drawings the numeral 10 generally designates a conventional form of crawler treaded tractor including a pair of opposite side driving crawler tread assemblies 12 and 14 which may be simultaneously or individually driven or braked.

The pulverizing attachment of the instant invention is generally referred to by the reference numeral 16 and includes a tool bar assembly generally referred to by the reference numeral 18 including a pair of generally longitudinally extending and parallel arms 20 pivotally secured to the assemblies 12 and 14 at their forward ends by means of suitable mounting brackets 22 and 24. The rear ends of the arms 20 are interconnected by means of a transverse member 26 and each of the arms 20 includes a depending portion 28 intermediate its opposite ends. Further, the rear ends of the arms 20 include depending legs 30.

Each of the depending portions rotatably journals a laterally extending stub shaft 32. The adjacent ends of the stub shafts 32 have support levers 34 supported therefrom and each of the support levers 34 is in an upright position. A horizontally disposed and transversely extending stripper blade 36 extends between the lower ends of the levers 34 and corresponding end portions of a pair of double acting extendable hydraulic cylinders 38 are secured to the upper ends of the levers 34.

A heavy mounting bracket generally referred to by the reference numeral 40 and including a main transverse portion 42, a rearwardly and upwardly projecting portion 44 extending rearwardly from the center portion of the transverse portion 42, a pair of inclined bracing portions 46 interconnecting opposite sides of the upper end of the rearwardly and upwardly projecting portion 44 and the corresponding end portions of the transverse portion 42, and a pair of mounting plate portions 48 dependingly supported from the transverse portion 42 is secured to the rear of the crawler treaded tractor 10 in any convenient manner such as by fasteners 50. The ends of the hydraulic cylinders 38 remote from the levers 34 are pivotally secured to the corresponding end portions of the transverse portion 42 as at 52 and one end of a double acting extendable hydraulic cylinder 54 is pivotally secured to the rear upper end of the rearwardly and upwardly projecting portion 44 as at 56 while the other end of the hydraulic motor 54 is pivotally supported from the mid portion of the transverse member 26 by means of a bracket 58 supported from the transverse portion 26 and including a pivotal connection 60 with the adjacent end of the hydraulic cylinder 54.

The crawler treaded tractor 10 is of a conventional type and includes a torque output shaft 60 of a power take-off assembly (not shown). A transverse brace 62 is secured to and extends between the arms 20 adjacent the depending portions 28 and supports a transmission assembly generally referred to by the reference numeral 64 adjacent its mid portion. The transmission assembly 64 includes an input shaft 66 which is drivingly coupled to the torque output shaft 60 by means of an intermediate shaft 68 coupled to the shafts 60 and 66 at its opposite ends by means of universal joints 70 and 72. The transmission 64 includes an output shaft 76.

A rigid axle housing assembly generally referred to by the reference numeral 80 is secured to and extends between the rear ends of the arms 20 and rotatably journals a pair of drive axles 82 and 84 whose adjacent ends are journaled by a central or third member 86 of the axle housing assembly 80. In addition, the adjacent ends of the axles 82 and 84 are driven from the shaft 76 for simultaneous rotation in the same direction.

The lower ends of the legs 30 include split clamp type journal assemblies 90 which are aligned and rotatably journal the opposite ends of a drive shaft 92. The drive shaft 92 has a pair of sprocket wheels 94 mounted on its opposite ends and the remote ends of the axles 82 and 84 have a pair of sprockets 96 mounted thereon which are aligned with the corresponding sprocket wheels 94. An endless chain 98 is entrained over each pair of corresponding sprocket wheels 94 and 96 and a sheet metal housing 100 encloses each set of sprocket wheels 94 and 96 and the associated chain 98. Each metal housing is supported by means of a pair of brackets 102 and 104 supported from the corresponding arm 20 and leg 30. It is of course to be understood that the shaft 76 is drivingly coupled to the adjacent ends of the shafts 82 and 84 for the purpose of driving the latter whereby the input torque delivered by the shaft 60 will be equally distributed to the opposite ends of the shaft 92.

A plurality of rotor wheels 108 are journaled on the shaft 92 between the split clamp journals 90 and include hub portions 110 provided with circumferentially spaced projections and recesses defining axially extending teeth and the teeth of each hub portion on shaft 92 are meshed with the teeth of the adjacent hub portion or hub portions.

Each end of the shaft 92 has a friction clutch assembly 112 mounted thereon which is adjustable and which serves to transmit the torque input to opposite ends of the shaft 92 to the rotor wheels.

Each of the rotor wheels 108 has a plurality of pairs of generally radially extending and circumferentially spaced threaded bores 114 formed therein and each pair of threaded bores 114 receives a pair of corresponding fasteners 116 utilized to secure the bight portion 118 of a generally U-shaped pulverizing tine 120 to the corresponding rotor wheel 108.

Each of the U-shaped tines 120 includes a pair of laterally directed end portions 122 on the free ends of its legs 124 and it may be seen from FIGURE 4 of the drawings that the free ends of the laterally directed end portions 122 of each tine 120 are closely spaced relative to the corresponding portions of the adjacent tines.

A generally semi-cylindrical shield 128 is supported from the legs 30 by means of suitable brackets 130 and embraces the upper portions of the rotor wheels 108.

With attention now invited more specifically to FIGURE 8 of the drawings it may be seen that each of the hydraulic cylinders 38 is operatively connected to the discharge of a hydraulic pump 134 by means of a suitable control valve assembly 136 and that the hydraulic cylinder 54 is also operatively connected to the discharge of the hydraulic pump 134 by means of the control valve assembly 136. The hydraulic pump 134 is of course operatively connected to the reservoir 140 of hydraulic fluid to which reservoir fluid is returned from the work chambers of the hydraulic cylinders 38 and 54 being reduced in volume through the control valve assembly 136. Accordingly, FIGURE 8 is a diagrammatical representation of a closed hydraulic system generally referred to by the reference numeral 142 for the attachment 16.

The control valve assembly 136 may be suitably positioned adjacent the operator's seat 144 of the crawler treaded tractor 10 for ease of operation of the various controls for extending and retracting the hydraulic cylinders 38 and 54. In addition, a suitable slide bracket 146 is supported from the crawler treaded tractor 10 and slidably receives the upper portion of a depth gauge bar 148 whose lower end is pivotally supporter from the corresponding arm 20 by means of any suitable pivot fastener 150. The upper end of the bar 148 is graduated with indicia as at 152 and a suitable clamp stop 154 is mounted on the upper end of the bar 148 for adjustable positioning therealong and movement therewith relative to the slide bracket 146 in order that the operator of the tractor 10 may readily ascertain the depth of operation of the rotary portion of the attachment 10 defined by the rotor wheels 108.

In operation, the blade or knife 36 may be vertically adjusted relative to the lower portions of the rotor wheels 108 by actuating the hydraulic cylinder 38. Then, as the tractor 10 traverses over the ground 156 the blade 36 will strip an upper layer 158 from the ground disposed beneath the blade 36 thereby presenting a single layer of ground to be acted upon by the rotor wheels 108. Inasmuch as the transmission 64 may vary the speed of the shaft 76 relative to the shaft 66, the pulverizing action of the rotor wheels 108 on the strip of ground cut by the blade 36 may be varied.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

What is claimed as new is as follows:

1. In combination with a tractor, a ground pulverizing attachment, said attachment including a pair of rearwardly projecting arms pivotally secured at their forward ends to opposite side portions of said tractor for rotation about generally horizontally disposed axes extending transversely of said tractor, transverse brace means extending between and secured to the rear end portions of said arms rearwardly of said tractor, elongated and generally horizontally disposed ground pulverizing means journaled from the rear end portions of said arms for rotation about an axis generally coinciding with the longitudinal center axis of said ground pulverizing means, means operatively connected between said tractor and said arms for adjustably swinging the latter relative to said tractor, means supported from said arms and operatively drivingly connected to said pulverizing means for effecting rotation of the latter, and elongated horizontally disposed ground stripping blade means supported from said arms and extending transversely of said tractor forwardly of said ground pulverizing means and adapted to strip an upper layer of dirt from the ground to be pulverized by said pulverizing means, a pair of upstanding lever arms pivotally secured adjacent their mid-portions to the first mentioned arms forwardly of said pulverizing means, said stripping blade means being supported from and extending between the lower ends of said lever arms, and means operatively connected between said tractor and the upper end portions of said lever arms for swinging the latter and said stripping blade supported therefrom.

2. The combination of claim 1 wherein said tractor includes a power take-off disposed adjacent its rear end, said means drivingly connected to said pulverizing means comprising means defining a driving connection between said power take-off and said pulverizing means.

3. The combination of claim 2 wherein said driving connection includes means for varying the rotational speed of said pulverizing means relative to the operating speed of said power take-off.

4. The combination of claim 1 wherein said means drivingly connected to said pulverizing means includes means operative to apply input driving torque to opposite ends of said pulverizing means.

5. The combination of claim 4 wherein said means drivingly connected to said pulverizing means also includs adjustable torque input limiting slip clutch means defining the driving connection between said means drivingly connected to said pulverizing means and the latter.

References Cited

UNITED STATES PATENTS

| 1,316,625 | 9/1919 | Lumm | 172—39 |
| 2,368,331 | 1/1945 | Seaman | 172—66 X |
| 2,514,395 | 7/1950 | Iseman | 172—119 X |
| 2,638,830 | 5/1953 | Kropp | 172—103 |
| 2,948,345 | 8/1960 | Brewster | 172—125 X |
| 2,986,841 | 6/1961 | MacDonald | 172—45 X |
| 3,101,794 | 8/1963 | Bechman | 172—698 |
| 3,348,619 | 10/1967 | Reynolds et al. | 172—66 |

FOREIGN PATENTS

| 445,375 | 4/1936 | Great Britain. |

ANTONIO F. GUIDA, Primary Examiner

ALAN E. KOPECKI, Assistant Examiner

U.S. Cl. X.R.

172—123, 488, 698